M. HOUSEMAN.
Corn Sheller.
No. 29,886. Patented Sept. 4, 1860.
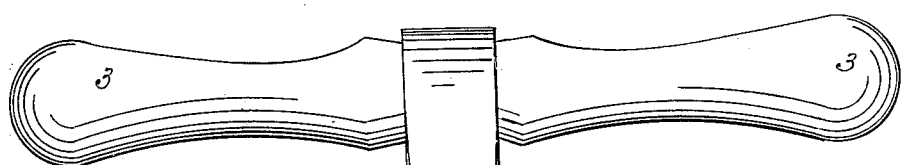
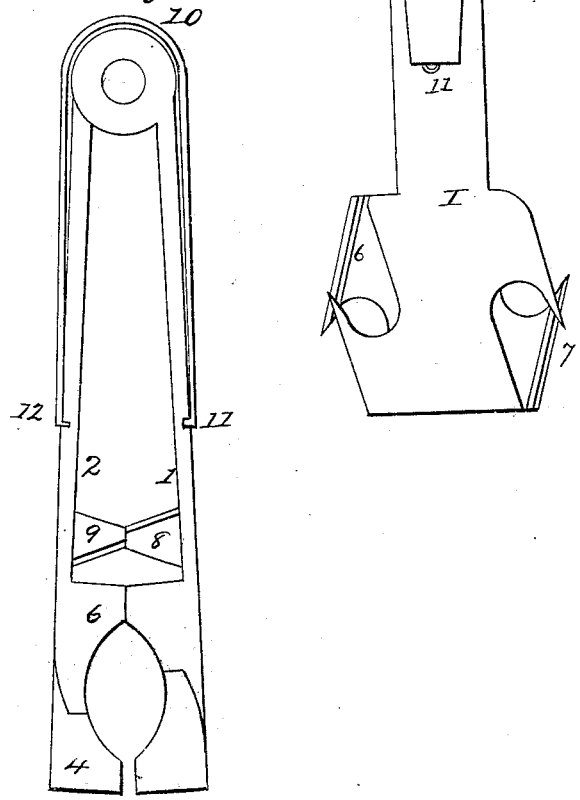
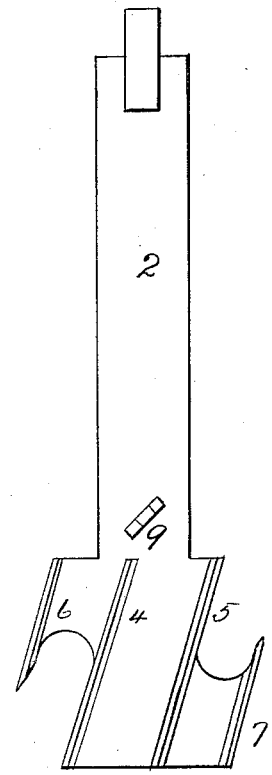

UNITED STATES PATENT OFFICE.

MICHAEL HAUSMAN, OF HUNTINGTON, INDIANA.

CORN-SHELLER.

Specification of Letters Patent No. 29,886, dated September 4, 1860.

*To all whom it may concern:*

Be it known that I, MICHAEL HAUSMAN, of Huntington, in the county of Huntington and State of Indiana, have invented a new and Improved Corn-Sheller, the construction and operation of which I have described in the following specification and illustrated in its accompanying drawings with sufficient clearness to enable competent and skilful workmen in the arts to which it pertains or is most nearly allied to make and use my invention.

My said invention consists in two blades or jaws of iron or other suitable metal, united at one extremity so as to be parallel or nearly so, by a hinge joint, through which is passed an axis which projects both ways so as to serve as a handle; the other ends of these jaws or blades being spread out into a broad paddle like shape, having a number of thin shells or flanges projecting inwardly from them at right angles, their directions being oblique to the length of the blades, and their edges being leveled off and hollowed out in the manner hereinafter described; the whole implement being so combined and arranged as to render it capable of being rotated, by means of the handle before described, around an ear of corn placed between the flanges, by which operation the grains of corn are effectually separated from the cob as hereinafter more fully set forth.

My invention is illustrated in the accompanying drawings as follows:

Figure 1 is a side elevation of my corn sheller. Fig. 2 is an edge elevation, the handle being supposed to be removed. Fig. 3 is an inside view of one of the blades, showing an edge elevation of the flanges.

1 and 2 are the two jaws or blades united together by the handle 3 passing through the hinge joint formed upon their upper extremities. These blades or jaws spread out at the lower ends as shown in Fig. 1, and have the two full length flanges 4 and 5, and the two half length flanges 6 and 7, projecting from their surfaces as shown in Fig. 3, the remainder of the broad surfaces being cut away in the manner shown in Fig. 1. The direction of these flanges is oblique to the length of the blades, as also shown, and their edges are beveled off and hollowed out as shown in Figs. 2, and 3. The directions of the flanges in each jaw or blade have each the same degree of inclination to the length of the blade to which they are attached, but in an opposite direction, the consequence of which is, that the flanges cross each other when the blades are in position, as shown in Fig. 1. Immediately above these broad portions of the blades are two small pieces or studs 8 and 9, projecting inwardly, the projection of each being sufficient, not only to allow them to meet, but also when met, to keep the blades so far apart as to prevent the flanges from coming into contact with each other. A spring 10 is also provided, and made of such form and length, as to allow it to be passed over the handle 3, and also over the two jaws 1 and 2; and from the inner surfaces of the lower extremities of this spring, two small pins or studs project, which enter the holes 11 and 12 in the jaws or blades, thereby keeping the spring in position. The object of this spring is to give the proper degree of resistance when the ear of corn is introduced, as will be more fully explained hereafter.

The mode of operation is as follows:—An ear of corn having been introduced between the flanges at the left hand side (see Fig. 1), and held in that position by the operator, with his left hand, he turns the whole instrument, with his right hand, by means of the handle 3 around the ear as an axis; the peculiar construction and inclination of the flanges, as hereinafter described, causing them to act as a hollow screw, and to gradually draw the ear forward between them toward the right hand of the operator, the natural consequence of which, is that the grains are stripped off, and fall into whatever receptacle may be prepared for receiving them. When the ear is half through the implement, or thereabout, so as to project toward the right hand, the operator then takes hold of the projecting part in his right hand, and operates the instrument with his left, until the ear is worked through.

Having thus fully described my invention, what I claim, and desire to have secured to me by Letters Patent, is:—

The jaws 1 and 2, the hinge joint by which they are united, the handle 3, the broad extremities of the jaws or blades with the flange projections 4, 5, 6, 7, and the corresponding flanges on the opposite blade, the spring 10, and the separating studs 9; the whole being constructed and arranged in the manner hereinbefore described, and operated and operating as set forth, and for the purpose stated.

MICHAEL HAUSMAN.

Witnesses:
MARTIN B. BRANDT,
A. W. LEWIS.